UNITED STATES PATENT OFFICE.

GEO. W. MORRIS AND WM. QUANN, OF PHILADELPHIA, PENNSYLVANIA.

IMPROVEMENT IN RESTORING BURNT IRON.

Specification forming part of Letters Patent No. 28,103, dated May 1, 1860.

*To all whom it may concern:*

Be it known that we, GEORGE W. MORRIS and WILLIAM QUANN, of the city and county of Philadelphia, State of Pennsylvania, have invented a certain new and useful process for restoring burnt iron and converting it in the cupola-furnace into iron of superior quality, available for the best description of castings, of which the following is a specification.

Heretofore burnt iron—such as old gas-retorts, grate-bars, &c., which are produced in enormous quantities in our large cities—has only been available at the foundries for the manufacture of weights or for coarse and heavy descriptions of castings in which weight is one of the most essential qualities. Of so little value is this description of iron in our large cities that it is thrown away or used as ballast in the place of stone for wharves or piers, or for such like uses. It has long been a desideratum among founders to improve the quality of this description of iron and render it available; but heretofore endeavors for effecting this object have not resulted in success. In melting iron in the cupola-furnace for the purpose of castings, it is well known that the quality of the iron is unchanged by this process, as no chemical change takes place in the iron, as is the case in the process of smelting iron in the blast-furnace, or in puddling or refining the iron in the puddling or refining furnaces. Hence the quality of castings produced with the cupola-furnace is dependent almost wholly on the quality of the pig or scrap metal used, and in melting in this furnace burnt iron or inferior qualities of pig or scrap metal only an inferior quality of castings has heretofore been produced from them.

Our invention for utilizing burnt iron and producing with the cupola-furnace a metal of great strength and suitable for the best quality of castings consists in mingling with the burnt iron manganic iron ore (which is found in extensive beds in West Whitland township, Chester county, Pennsylvania, and also in York county in the same State, which, from analysis, is shown to contain about eighty-three and six-tenths per cent. of the sesquioxide of iron and seven and six-tenths of the oxide of manganese, with silicious matter and alumina) in such proportions as may be required, and then melting the whole in the cupola-furnace in the ordinary manner.

To enable those skilled in the art to use and apply our invention, we will now describe the manner in which it is carried into effect.

In order to restore burnt iron—such as burnt gas-retorts or other burnt cast or wrought iron—we mingle with it about equal weights of the before-named manganesian iron ore which has previously been reduced to powder. The mingled mass of iron and ore is then thrown into the cupola-furnace with the proper amount of fuel to melt the same, and when melted it is run off in the ordinary manner and castings made from it.

The iron produced from this admixture of burnt iron with this manganesian iron ore is found equal in quality to the best quality of pig metal, possessing great toughness and sufficient softness to be used for castings for machinery requiring great strength, and sufficient softness to be easily worked, and for which heretofore only the best and the most expensive quality of pig iron has been used.

We do not confine ourselves to the use of the manganesian iron ore from the localities before mentioned, as manganesian iron ores may be discovered in other localities equally applicable for refining and improving the qualities of iron when mingled with it and melted in the cupola-furnace.

We do not claim mingling pig or scrap metal with a ferromanganic or other description of iron ore and melting in the blast, the puddling, or the refining furnace for the purpose of improving its quality, as this is no part of our invention; but

We claim—

Refining burnt iron while melting it in the cupola-furnace by mingling with it a manganesian iron ore in proper proportions, and melting the whole mass together in the furnace, as described.

In testimony whereof we have signed our names to this specification in the presence of two subscribing witnesses.

GEORGE W. MORRIS.
      WILLIAM QUANN.

Witnesses:
 HENRY HOWSON,
 HENRY ODIORNE.